July 25, 1939.　　　H. HEANES　　　2,167,419
ELECTRIC METER BOX
Filed Jan. 5, 1938　　　4 Sheets-Sheet 1
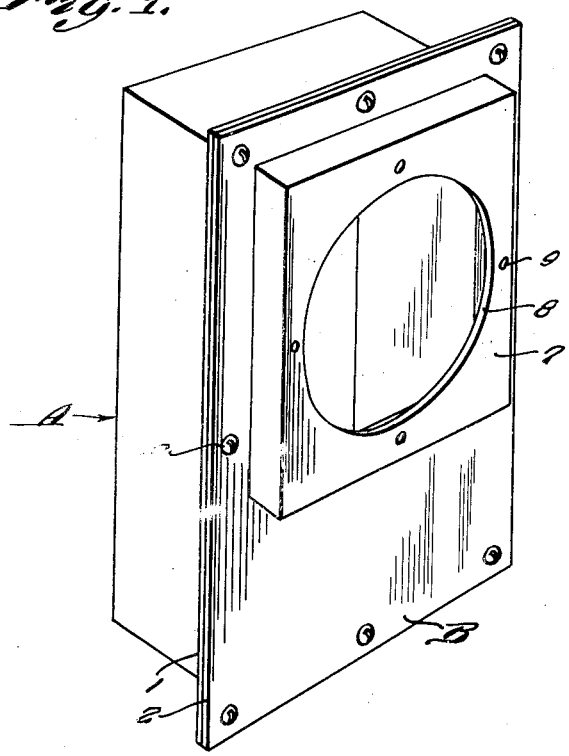
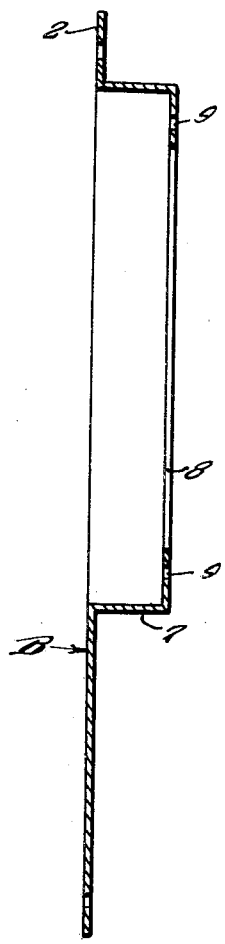
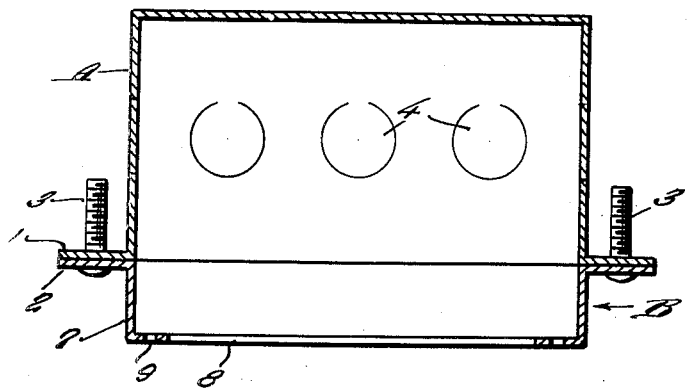
Inventor
Herbert Heanes
By L. B. James
Attorney

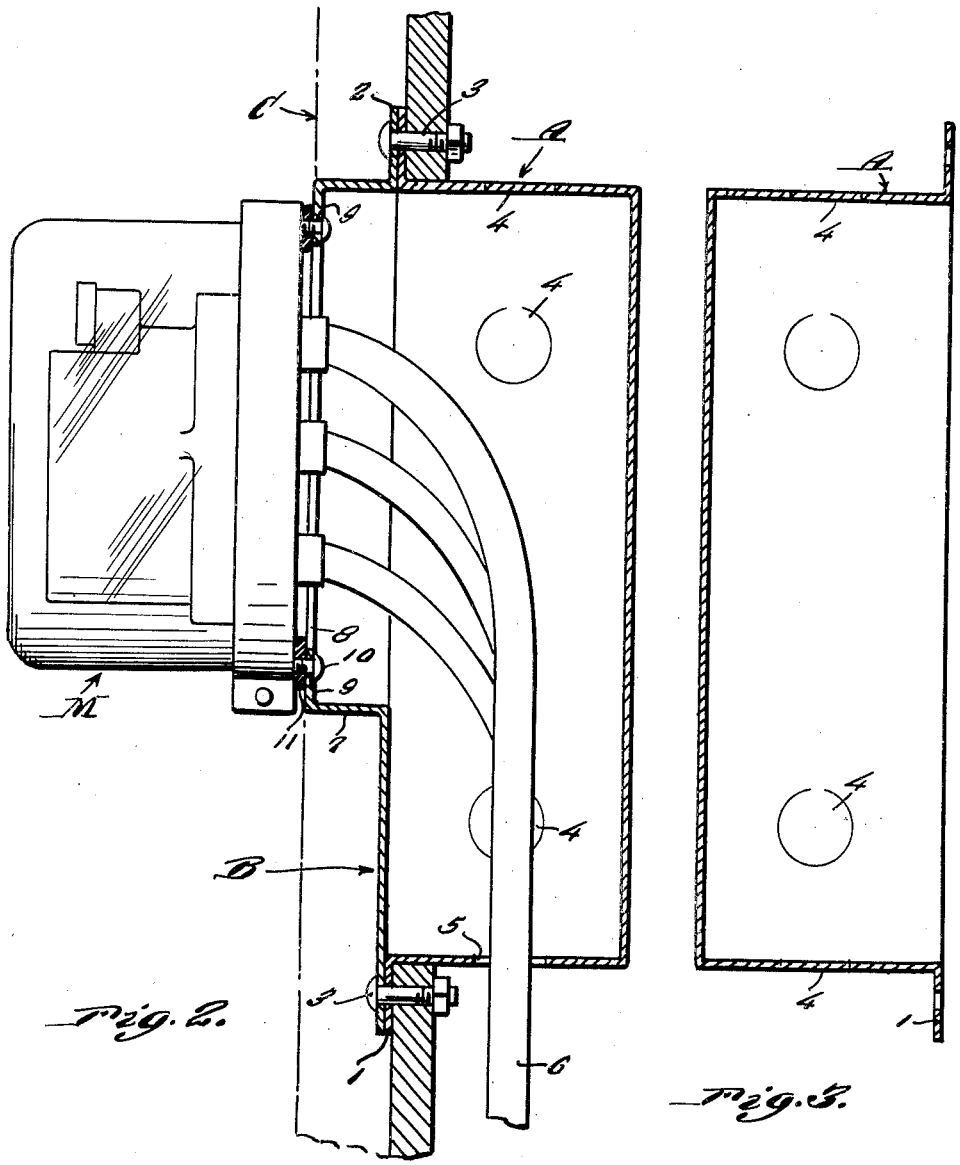

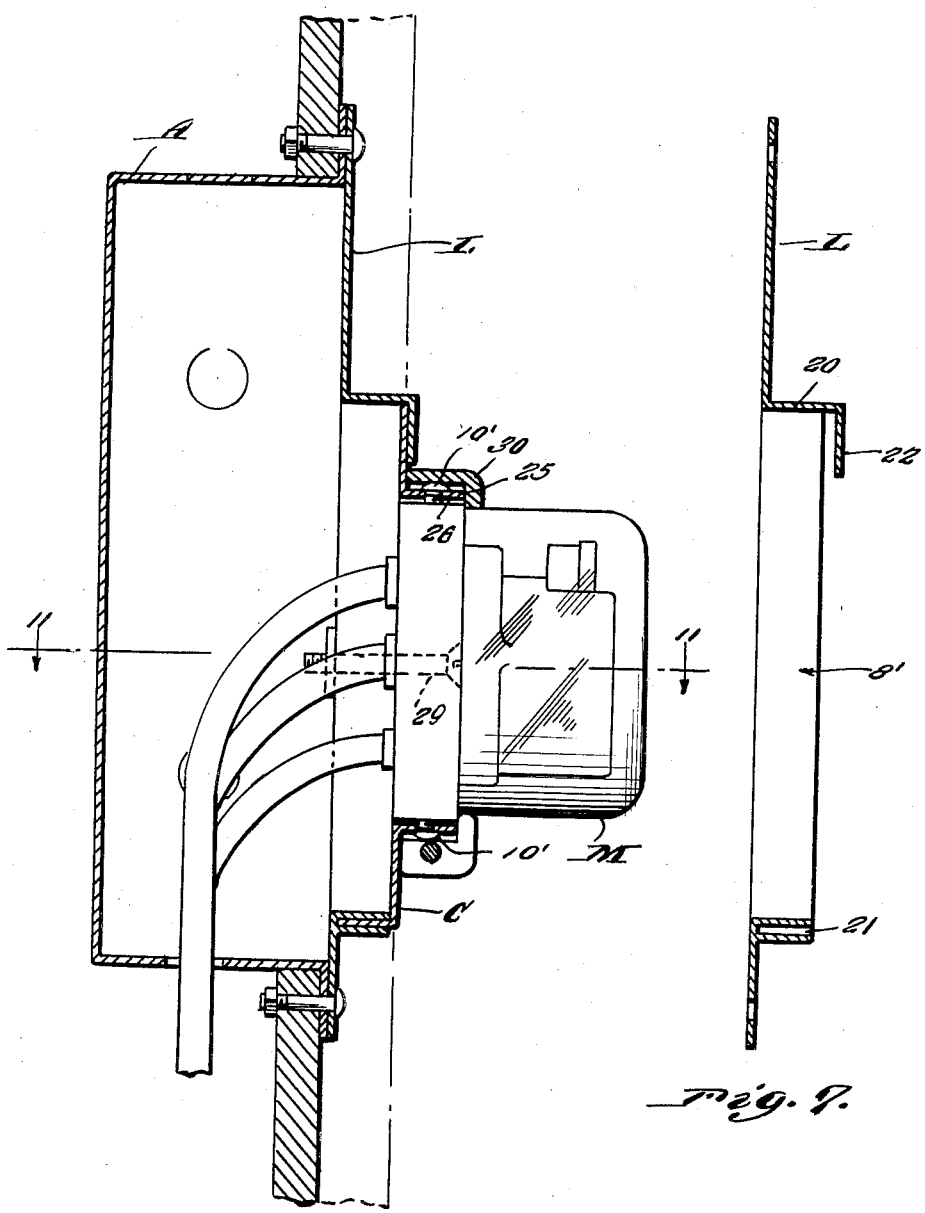

July 25, 1939.  H. HEANES  2,167,419
ELECTRIC METER BOX
Filed Jan. 5, 1938  4 Sheets-Sheet 4

Inventor
Herbert Heanes
By L. B. James
Attorney

Patented July 25, 1939

2,167,419

UNITED STATES PATENT OFFICE 2,167,419

ELECTRIC METER BOX

Herbert Heanes, Santa Ana, Calif.

Application January 5, 1938, Serial No. 183,520

1 Claim. (Cl. 175—220)

This invention relates to a meter box, the general object of the invention being to provide a box which will be flush with the wall to which it is applied and one which can be easily put in place and the connections made and the meter easily and quickly attached.

Another object of the invention is to provide the box with a plurality of weakened circular lines which can be knocked out to provide holes for the passage of conductors, wherever desired and to provide a removable lid to which the meter is attached.

The invention also consists in certain other features of construction, combination and arrangement of the several parts, to be hereinafter fully described, illustrated in the accompanying drawings and specifically pointed out in the appended claim.

In describing the invention in detail reference will be had to the accompanying drawings wherein like characters denote like or corresponding parts throughout the several views, and in which:

Fig. 1 is a perspective view of the box looking towards the front thereof.

Fig. 2 is a sectional view showing the box attached to a wall and with the meter attached to the lid of the box.

Fig. 3 is a longitudinal sectional view of the box.

Fig. 4 is a longitudinal sectional view of the lid.

Fig. 5 is a transverse sectional view through the box and lid.

Fig. 6 is a sectional view showing a modified form of the box.

Fig. 7 is a sectional view of the lid per se of the box shown in Fig. 6.

Figure 8:
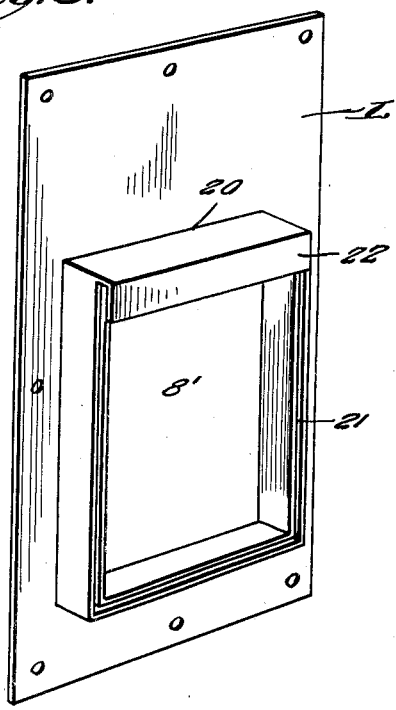
Fig. 8 is a detail perspective view of the lid shown in Fig. 7.

In these drawings, the letter A indicates the box and the letter B the lid. The box is provided with a flange 1 at its outer or open side against which fits the flange 2 of the lid, the two flanges being connected together by the screws or bolts 3. The box has a plurality of weakened circular lines 4 in its walls which are adapted to be knocked out to form the holes 5 for the passage of the conductors 6, it being understood that the holes can be made wherever it is desired to have the conductors enter the box.

The lid B is formed with a rectangular outwardly extended part 7, which is pressed from the lid and is located on the upper part of the lid. The part 7 is formed with a large opening 8 and around this opening are a plurality of holes 9 for receiving the screws or bolts 10 which fasten the meter M to said part 7 of the lid. Of course the conductors pass through the large opening 8 and are connected with the meter as shown in Fig. 2. The usual gasket 11 is used to provide a moisture proof connection between the lid and the meter. The extended part 7 enables the box to be fastened to a part of a wall and then when the plaster or other coating C is applied, the outer face of the extended part 7 will be flush with the wall, as shown in Fig. 2, though the device can be used with walls made of brick, lath and plaster, concrete or sided buildings.

The box provides ample space for the splicing of wires and a number of the devices can be ganged together by short nipples passing through the studding. The device does away with excess carpenter work and it also does away with the usual elbows and the like. All conduits are concealed and it can be installed inside or outside of buildings. It can be sealed by the power company with one seal instead of the three seals usually used. It is thoroughly waterproof even though it is flush with the wall.

Figure 9:
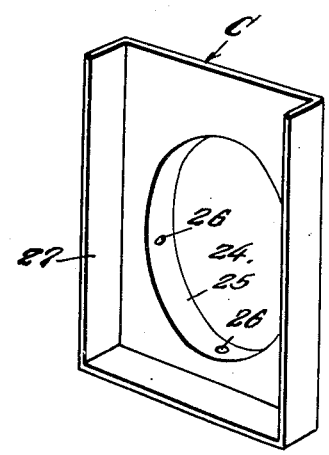
Fig. 9 is a detail perspective view of the meter supporting cap.
Figure 10:
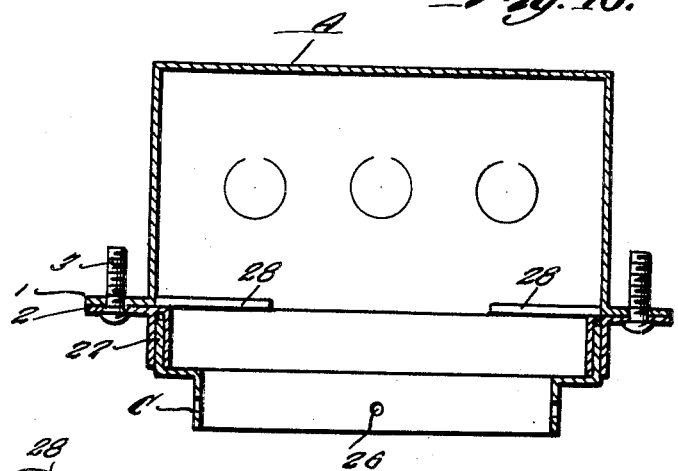
Fig. 10 is a horizontal sectional view approximately on line 10—10 of Fig. 6 with the meter removed.
Figure 11:
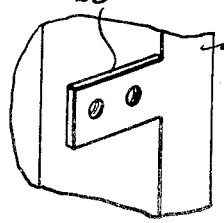
Fig. 11 is a detail perspective view of a portion of the lid showing one of the meter securing lugs.

In the modified form of the box A as illustrated in Figs. 6 to 11 inclusive a lid indicated by the letter L is adapted to be secured thereto in a manner similar to that employed in the preferred form of the invention.

The lid L is preferably provided with a large opening 8' surrounded by an outwardly extending flange 20 having its bottom and side edges provided with a groove 21 and its upper edge with an overhanging lip 22 which is disposed in spaced relation from the edges of the adjacent portion of the flange.

Adapted to be removably assembled on the lid L of the box is a cap C which is preferably of rectangular configuration and having a large hole 24 therein surrounded by an outwardly extending flange 25 provided with apertures 26 for the reception of fastening elements 10' to secure the meter M thereto in a manner similar to that shown in Fig. 2. The cap C is also provided with a marginal inwardly extending flange 27 around its bottom and side edges which is adapted to be seated in the groove 21 of the lid when in assembled position therewith and, through the instrumentality of lugs 28 formed on the box and suitable fastening elements 29, the cap and meter thereon cannot be removed without breaking the seal of a sealing ring indicated at 30.

With the lid L of the modified form of the meter box secured in assembled relation with the box and meter connected to the conduits and cap C, it is simply necessary to insert the upper non-flanged edge of the cap beneath the overhanging lip 23 of the lid L and insert the flange 27 within the groove 21 after which the fastening elements 29 are engaged with the lugs 28 of the box and the sealing ring disposed over the same to insure against removal of or tampering with the meter without breaking the seal thereof.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

A meter box of the class described comprising a box, a removable lid having a large hole therein, an outwardly extending flange around the edges of the hole in the lid, the upper portion thereof extending outwardly beyond its side portion and its lower portion being provided with an elongated groove, an overhanging lip on the upper portion of the flange disposed in spaced relation from the side portions thereof, a meter supporting cap having its upper end disposed behind the lip and its lower end bent at right angles to its body portion and seated in the aforesaid groove, an outwardly extending flange formed on said cap and having apertures therein, fastening elements passing through the apertures in the flange of the meter supporting cap and securing a meter within the opening of the cap, a split ring surrounding the flange of the cap and having its inner edge abutting the cap and its outer portion bent at right angles to the front of a shoulder formed on the meter, securing means connecting the split end of the ring and means securing the meter supporting cap and meter carried thereby to the box.

HERBERT HEANES.